(12) United States Patent
Caldwell

(10) Patent No.: US 6,464,893 B1
(45) Date of Patent: Oct. 15, 2002

(54) PROCESS FOR PREPARATION OF THIN METALLIC FOILS AND ORGANIC THIN-FILM-METAL STRUCTURES

(75) Inventor: Karen R. Caldwell, Mohegan Lake, NY (US)

(73) Assignee: Pace University, New York, NY (US)

( * ) Notice: Subject to any disclaimer, the term of this patent is extended or adjusted under 35 U.S.C. 154(b) by 0 days.

(21) Appl. No.: 09/568,303

(22) Filed: May 9, 2000

(51) Int. Cl.[7] ............... B44C 1/22; C23F 1/00
(52) U.S. Cl. ............ 216/91; 216/96; 216/100; 216/106; 216/105
(58) Field of Search ............ 216/91, 96, 100, 216/105, 106

(56) References Cited

U.S. PATENT DOCUMENTS

| | | | |
|---|---|---|---|
| 3,345,225 A | | 10/1967 | Lacal et al. |
| 3,539,407 A | * | 11/1970 | Frantzen ............ 216/105 |
| 3,772,104 A | * | 11/1973 | Chandross et al. ...... 216/100 |
| 4,497,687 A | * | 2/1985 | Nelson ............ 216/105 |
| 4,654,116 A | * | 3/1987 | Spacer ............ 216/105 |
| 5,486,234 A | * | 1/1996 | Contolini et al. ........ 216/91 |
| 5,759,427 A | | 6/1998 | Andrew et al. |
| 6,106,907 A | * | 8/2000 | Yoshikawa et al. ........ 428/1.1 |

FOREIGN PATENT DOCUMENTS

| | | |
|---|---|---|
| WO | WO9905509 | 2/1999 |

OTHER PUBLICATIONS

Patent Abstracts of Japan, vol. 1996, No. 11, Nov. 29, 1996 & JP 08 188885 A (Hitachi Ltd), Jul. 23, 1996 abstract.
Patent Abstracts of Japan, vol. 1999, No. 01, Jan. 29, 1999 & JP 10 270414 A (TERA TEC:KK), Oct. 9, 1998 abstract.

* cited by examiner

*Primary Examiner*—Randy Gulakowski
*Assistant Examiner*—Shamim Ahmed
(74) *Attorney, Agent, or Firm*—Ostrolenk, Faber, Gerb & Soffen, LLP

(57) ABSTRACT

Controlled chemical etching of rotating metal substrates has been shown to be a feasible and economic method for the reproducible production of thin, reactive metallic foils such as copper foils. Foils thus prepared react readily with chemical substances, apparently by chemisorption. The organic-metal assemblies exhibit the same corrosion and wetting behavior as those prepared by other processes, and they readily undergo additional functional group transformations.

18 Claims, No Drawings

PROCESS FOR PREPARATION OF THIN METALLIC FOILS AND ORGANIC THIN-FILM-METAL STRUCTURES

BACKGROUND OF THE INVENTION

The ability to prepare and manipulate organic thin-film-metal structures in a well-defined way is critically important in areas as diverse as sensing, adhesion, tribology, corrosion and nanoscale electronics. For example, FTIR spectroscopy in the Attenuated Total Reflection mode (ATR-FTIR) is a widely used surface analytical method for investigating an organic-metal interface. One of the most popular ATR attachments employs a 45° ZnSe single crystal with an available sample area of 10 mm×70 mm (Horizontal Contact Sampler, Spectra-Tech, Inc.). In order to obtain the maximum possible ATR-FTIR signal strength, it is necessary to ensure maximum interfacial contact between the ZnSe crystal and the sample. Thin, smooth metallic foils are, therefore, a practical requirement for such surface studies.

Many types of thin metallic foils necessary as substrates in this area of research are commercially available but the cost of such materials is frequently too high for researchers with limited resources. For instance, single crystal pieces of any metal, whether precious or non-precious, and polycrystalline pieces of all precious metals typically cost at least about $1500 cm$^{-2}$. Thus, each 4 cm$^2$ piece of commercial thin copper foil costs about $16 and many such pieces must be used during an investigation. Accordingly, an inexpensive way to obtain high quality thin metallic foils is desirable.

There has been a surge of interest in fundamental studies involving the properties in chemical reactivity of organic films on metallic copper evident in the recent scientific literature. A method of producing thin copper foils is therefore expected to be of particular interest to those presently involved in organic-copper interfacial chemistry, as well as people who are contemplating entry into this area.

SUMMARY OF THE INVENTION

This invention provides a new method for the preparation of thin metallic foils and organic thin film-metal composites using such foils. More particularly, the invention provides a method in which a metallic substrate is rotated and contacted with an etchant so as to reduce the thickness of the metal substrate by corrosion and realize the desired foil thickness. The resulting thin foil can then be contacted with the organic material so as to form a thin film of the organic material on the surface of the foil.

DESCRIPTION OF THE INVENTION

The process of the present invention is applicable to any metal substrate. While it can be applied to precious and rare metals, because the process depends on a controlled corrosion, it is generally impractical for such metals because of the cost involved. A non-precious metal is therefore preferred. At present, the most preferred metal to which the process of the present invention can be applied is copper.

The thickness and other dimensions of the metal substrate employed are not restricted as long as the substrate can be rotated. Relatively thick metallic foils are commercially available and the use of such substrates is generally preferred. In general, it is preferred to employ a substrate having a thickness in the range from about 0.01 to about 1 mm and preferably from about 0.1 to 0.6 mm. It is also generally preferred, although not essential, that the substrate employed be in the form of a circular disk.

The metal substrate is rotated in any convenient manner, for instance by being mounted on a suitable rotatable supporting structure. The mounting also serves to protect one of the major faces of the substrate from the etchant and thereby minimize point breakthroughs which are more likely to occur when two opposing surfaces are being simultaneously etched. The speed of rotation can be adjusted as desired depending on the particular metal substrate employed, the particular etchant, the temperature and pressure conditions employed, and the desired rate of etching. In general, the rotation is usually within the range of about 100–1000 rpm, preferably 200–600 rpm.

Any etchant which acts chemically on the metal substrate to remove surface from that substrate can be employed. In general, inorganic acids such as hydrochloric acid, sulphuric acid, nitric acid and hydrofluoric acid can be used, with nitric acid being particularly preferred, but the range of etchants usable is not limited to this list. The etchant and metal substrate are contacted under etching conditions. For some combinations of etchant and metal, elevated temperature and/or pressure may be appropriate while other combinations can be processed under ambient or other conditions.

The etchant and metal substrate are contacted under the etching conditions for a time sufficient to reduce the substrate thickness to the foil thickness desired. If desired or convenient, the contacting may be done a plurality of times until the desired foil thickness is achieved. For example, the metal substrate can be separated from the etchant periodically and the exposed surface washed or otherwise cleaned before contact with the etchant is reestablished. The thickness of the desired thin foil is typically on the order of about 1 to 100 $\mu$m and preferably about 10 to 90 $\mu$m. Frequently about 60–90% and more frequently about 70–85% of the initial mass of the metal is eliminated as a result of the etching procedure.

Forming an organic thin film on a thin metal foil is per se known. The foil and the organic material are brought into contact under suitable conditions so as to form an organic thin film on the surface of the metal foil. Any procedure and any organic material which has been used heretofore can be used in accordance with the present invention which differs from such prior procedures by using the thin metal foil produced by the rotating etching procedure described above.

In order to further illustrate the present invention, experimental procedures and results are described below. It will be understood that these examples are intended to be illustrative and non-limiting. Unless otherwise indicated, all temperatures are in degrees Centigrade and all parts and percentages are by weight throughout this specification and claims.

General. Kinetic data were obtained with copper sheet (Johnson Matthey, 0.60 mm thickness, 99.9% purity). Copper "Heavy Foil" (J. T. Baker, 0.127 mm thickness, $\geq$99.90% purity) was used for all other experiments. Water was deionized (DI) via reverse osmosis (Barnstable Nanopure II system, resistivity 16.7 M$\Omega$). Anhydrous ethanol (Phannco), hexane (Fisher, HPLC grade), acetone (Fisher, reagent grade), dichloromethane (Fisher, HPLC grade), dodecane (Aldrich, 99.9+%), concentrated nitric acid (Fisher, reagent grade), dodecanethiol (Aldrich, 98+%), 11-mercapto-1-undecanol (Aldrich, 97%) and acetyl chloride (Aldrich, 97%) were used as received. Visible spectroscopy was carried out on a Milton Roy Model Spectronic 20 spectrophotometer. FTIR spectra were obtained on a Mattson Galaxy Model 3000 spectro-photometer, using Win 1st software for processing (DTGS detector, 2-cm$^{-1}$ resolution). ATR-FTIR spectra were obtained using a Horizontal Contact Sampler (Spectra-Tech, Inc.) fitted with a 10-mm×70-mm ZnSe crystal (45°, 12 internal reflections). Two 10 mm×35 mm strips were cut from each sample and were laid end-to-end on the ZnSe crystal before application of pressure by the gripper. The ATR-FTIR sample compartment was purged with nitrogen before analysis of samples. IR spectral assignments were assigned, in part, with the aid of molecular modeling data (PC Spartan Plus™, Wavefunction, Inc.), using a PM3 basis set.

Kinetics. A circular disk 48 mm in diameter was cut from copper sheet of nominal 0.60-mm thickness (8.28 g, 0.130 g-atom, 99.9% purity). The center of the disk was fastened to the circular end of a wooden dowel (6 mm in diameter, 15 cm in length) with two-part "5-minute" epoxy adhesive. After the adhesive cured, the disk/dowel assembly was attached to a digital stirring motor (IKA Tech, Inc., Eurostar™ model). The disk was vigorously abraded with emery paper and then lowered into 6 N $HNO_3$ (75 mL, 0.45 mol, contained in a 4-mm×80-mm crystallizing dish). The disk was allowed to rotate at room temperature for 5 minutes at a total spinning rate of 500 rpm. Evolution of hydrogen gas was evident, as was the development of the characteristic blue color of aqueous $Cu(NO_3)_2$. The resulting solution showed a maximum in the visible spectrum at $\lambda$=370 nm. The copper disk was rinsed with DI water, then lowered into 75 mL of fresh 6 N $HNO_3$. The rotating rate was adjusted to 250 rpm, and 3.1-mL aliquots were removed at periodic intervals for spectroscopic analysis at $\lambda$=370 nm. Absorbance values for each kinetic point were corrected by a factor of (solution volume at time t)/(initial volume of solution) to compensate for the volume of each aliquot removed. The observed pseudo-first order rate constant, $K_{obsd}$, was determined from the semilog plot of the corrected absorbance values, $Abs_{corr}$, vs. time, t.

Standard Etching Protocol. Hydrogen gas and $NO_x$ fumes are rapidly generated in the initial phase of this exothermic reaction. Therefore, this procedure was carried out in a good fume hood, using appropriate personal protective gear, and ensuring that no potential sources of ignition are present. A circular disk was cut from the copper "Heavy Foil" of nominal 0.127-mm thickness ($\geq$99.90% purity). The disk diameter was 60.0 mm (3.45 g Cu). The disk was fastened to the end of a wooden dowel as described above. The disk/dowel assembly was attached to the digital stirring motor, and the disk was carefully lowered onto the surface of a cooled nitric acid solution (30 mL, 7.5 N, ice water bath, T$\approx$20° C.) contained in a 80 mm×40 mm crystallizing dish. Stirring was immediately begun (200 rpm). The corrosion reaction of copper was quite vigorous initially. Hydrogen gas and brown $NO_x$ fumes evolved from the metal-solution interface; the first-formed product had a deep emerald-green color before its complete dispersal into the bulk medium. An additional 15-mL portion of DI water was added within ca. 15 s, and the disk was raised so that the lower disk surface continued its rotation at the liquid-air interface. At that point, the volume of solution was ca. 45mL and the $HNO_3$ concentration was 5.0 N. The solution developed an intense blue color as reaction progressed. Stirring was allowed to continue for an additional 7–8 min; the size of the evolving $H_2$ gas bubbles appeared constant ($\approx$0.5 mm) throughout the reaction period. Stirring was discontinued and the thin copper disk was slowly raised from the liquid. After quickly rinsing with DI water and acetone, the disk was allowed to air dry. Using a scalpel, the thin-foil disk was carefully detached from the epoxy adhesive that had fastened it to the dowel. The foils were subsequently handled only with polypropylene tweezers. The thin foils were either stored in polyethylene bags, stored in the open atmosphere, or used immediately for chemical adsorption experiments.

Adsorption Experiments. Thin copper foils were subjected to a preadsorption protocol immediately prior to chemical adsorption regimens. This preadsorption protocol consisted of a quick treatment with 2 N $HNO_3$ (ca. 5 mL for 2–10 s), followed by rinses by DI water and either anhydrous ethanol or acetone. The foils were then treated within ca. 5 s with chemical reagents in adsorption experiments (either as 0.05–020 M ethanolic solutions or as neat liquids). While not effected in an oxygen free system, high quality organic material monolayers could be obtained as long as the exposure to air was minimized between the etching, rinsing and absorption steps.

Results and Discussion

Kinetics. In the kinetics experiment, a plot of [ln $(Abs_{corr})$] vs. time (t) gave a straight line, with an observed pseudo-first order rate constant of 0.038 s$^{-1}$ ($t_{1/2}$=18 s). This pseudo-first order kinetic behavior is expected for a diffusion-controlled reaction at a rotating disk. Immediately after the etch reaction, the copper surface had a glittery, pinkish appearance. After rinses with DI water and acetone, tarnishing of the dry surface became evident within ca. 25 min. Additionally, the copper disk displayed the characteristic swirled, pattern of etching. The final thickness of the disk was ca. 50 $\mu$m. This particular disk was neither flat nor malleable; it was only used to demonstrate that the expected kinetic behavior was obtained.

Standard Etching Protocol. The Standard Etching Protocol described above successfully and reproducibly provided thin, flat, smooth foils of metallic copper of reasonably uniform thickness. The thickness of each foil thus prepared was measured at four points at the edge of the piece and at its center with a micrometer. Typical values were: 10 $\mu$m, 15 $\mu$m, 28 $\mu$m, 12 $\mu$m (four equally-spaced points around the perimeter); 82 $\mu$m (at the center). It is noteworthy that 70–85% of the initial mass of copper was lost as a result of the controlled etch. The initial appearance of the resulting thin copper foil was smooth, glittery and rose pink in color. The individual grains of the polycrystalline metal were visible to the eye. Each grain appeared to be ca. 0.01–0.10 mm$^2$ in area.

Adsorption Experiments. Treatment of the prepared thin copper foils with ethanolic solutions of dodecanethiol (DT) or 11-mercapto- 1-undecanol (MUD) afforded samples which were characterized by their corrosion and wetting behavior, and by their ATR-FTIR spectra. In the case of MUD on copper, subsequent chemical reactivity of the putative hydroxy-terminated monolayer was also tested.

Corrosion protection of metallic copper was conveyed by both DT and MUD, as judged by visual inspection of samples which were stored in polyethylene bags. DT on copper (DT/Cu) showed little evidence of tarnishing over a 12-month period. In contrast, some darkening of the MUD/Cu samples was apparent over a period of 1–2 weeks. These observations generally agree with results reported previously. DT/Cu samples that were gently swiped with a dry lab tissue showed a tendency to darken within hours at the location of mechanical disruption, indicating reoxidation of the metal.

DT/Cu is completely wetted by dodecane and not wetted by DI water (50 $\mu$L, sessile drop). MUD/Cu is completely wetted by dodecane and partially wetted by DI water (contact angle≈130°, initially: the contact angle with water decreased to ca. 80° after 22 hr). The general wetting/repellancy behavior of both DT/Cu and MUD/Cu is consistent with contact angle measurements previously reported.

The results of ATR-FTIR analyses of DT/Cu and MUD/Cu samples, as well as IR data for the absorbates, are presented in Table I and Table II. Generally, lower frequency skeletal stretches and bends were easily discernible for these samples (1500–600 cm$^{-1}$ region). The appearance of new absorbance bands in this region, characteristic for C—C and C—O stretching modes, CH$_2$ bending modes, and related coupled vibrational modes, strongly suggests that organic thin-film/copper structures were formed. For each sample, however, ν(S—H) was absent, which is consistent with the formation of a covalent Cu(I)-thiolate linkage on the metallic surface.

TABLE I

Frequencies in wave numbers (cm$^{-1}$)

| | (S-H) | (C-S) | (O-H) | (C-O) |
|---|---|---|---|---|
| DT Neat, TS | 1466 | 721 | NA | NA |
| DT/Cu ATR spectrum | ND | 690[a] | NA | NA |
| MUD ZnSe, ATR spectrum | 1468 | 720 | 3420, 3345[b] | 1064 |
| MUD KBr, TS | 1469 | 721 | 3424, 3362[b] | 1065 |
| MUD/Cu ATR spectrum | ND | 724 | ND low S/N | 1055 |

NA = not applicable;
S/N = signal to noise;
ND = not detected;
TS = transmission spectrum;;
[a]peak in broad 800-600 cm$^{-1}$ band;
[b]Equal intensity intermolecular hydrogen bond to oxygen (higher) and sulfur (lower) signals.

TABLE II

IR Vibrations between 1350 cm$^{-1}$ and 600 cm$^{-1}$ (ATR-FTIR Spectral Data)

| Sample | Frequencies | Peak Shape | Peak Position | Abs at Peak |
|---|---|---|---|---|
| DT/Cu | 1320-1200 | Broad Band | 1253 | 0.002 |
| | 1200-1000 | Broad Band | 1098 | 0.004 |
| | 800-600 | Broad Band | 690 | 0.005 |
| MUD/Cu | 1187 | Broad Peak | 1187 | 0.001 |
| | 1140-940 | Broad Band | 1055 | 0.002 |
| | 900-758 | Several unresolved bands | (Indistinct) | Max. ≈ 0.001 |
| | 724, 726 | Sharp peaks | 724, 726 | 0.002 for each |

The experimental IR signals can be compared with computational predictions for the model mononuclear compounds dodecylthiolatotriphosphinecopper(I), (CH$_3$—(CH$_2$)$_{11}$—S—Cu(PH$_3$)$_3$, (A in Table III) and 11-hydroxyundecylthiolatotriphosphinecopper(I), (HO—CH$_2$)$_{11}$—S—Cu—(PH$_3$)$_3$, (B in Table III). Because of the overall broadness of the experimental IR absorptions in the 1350–600 cm$^{-1}$ region and the low signal strengths involved (Table II), it is not possible to make definitive assignments. It can be concluded, however, that the experimental data generally agree with the computational predictions, further supporting the conclusion that thin copper foils prepared by the protocol described are viable substrates for chemisorption with DT and MUD.

Freshly prepared MUD/Cu assemblies undergo additional chemical derivatization. When treated with acetyl chloride (neat, followed by an ethanol rinse and air drying), the resulting organic-copper samples exhibit the expected changes in the ATR-FTIR spectrum, with characteristic signals appearing for the new ester moiety: CH$_3$—C(O)—O—(CH$_2$)$_{11}$—S—Cu$_s$.

TABLE III

| Compound | Frequencies in wave numbers (cm$^{-1}$)[a] | Assignment |
|---|---|---|
| A | 1296-1190 (20 bands) | CH$_3$(CH$_2$)$_{11}$-skeleton; various combinations of C—C stretches, CH$_2$ bends (in-plane, out-of-plane, asymmetric, symmetric) |
| | 1162, 1134 | C—S stretch, in combinations with CH$_2$ wags (C$_1$—C$_{12}$, asymm) and C—C stretches |
| | 1108-729 (33 bands) | CH$_3$(CH$_2$)$_{11}$-skeleton: various combinations of CH$_2$ bends (in-plane, out-of-plane, asymmetric, symmetric), C—C stretches, C—C—C bends |
| | 714 | C—S stretch |
| | 708-683 (4 bands) | CH$_3$(CH$_2$)$_{11}$-skeleton: CH$_2$ bends (in-plane) |
| | 597 | Cu—S stretch |
| B | 1295-1194 (18 bands) | HO—(CH$_2$)$_{11}$-skeleton: various combinations of C—O stretches, C—C stretches, C—O—H bends, CH$_2$ bends (in-plane, out-of-plane, asymmetric, symmetric) |
| | 1165, 1137 | C—S stretch, in combination with skeletal C—O stretch, C—C stretches and CH$_2$ bends |
| | 1109 | C—O stretch and C—C stretches and CH$_2$ bends |
| | 1085, 1065 | Cu—S—C bend combined with C—O and C—C stretches and CH$_2$ bends |
| | 1074-1054 (4 bands) | HO—(CH$_2$)$_{11}$-skeleton: various combinations of C—C stretches + CH$_2$ bends |
| | 1052-878 (17 bands) | HO—(CH$_2$)$_{11}$-skeleton: various combinations of C—O and C—C stretches + CH$_2$ bends |
| | 1038, 1023, 979, 845, 8006, 768, 735 | Cu—S—C bend, in combination with various C—O and C—C stretches, C—O—H bend, and CH$_2$ bends |
| | 714 | Cu—S stretch |
| | 710-683 (4 bands) | HO—(CH$_2$)$_{11}$-skeleton: various combinations of CH$_2$ bends |

[a]Computed for geometry-optimized molecules using PC Spartan Plus ™ (PM3 basis set); values reported were obtained by scaling computational results by 0.90.

Conclusion

Clean, reactive metallic copper surfaces can b prepared in a well-defined manner by taking advantage of the hydrodynamics of he rotating disk system. Copper disks can be corroded uniformly to produce thin, reactive metallic foils, to which organic materials adhere. The nature of the resulting organic films on copper, as examined by ATR-FTIR spectroscopy and by wetting and corrosion-protection behavior, is the same as for those reported previously.

The standard etching protocol was developed it order to (1) product flat, chemically reactive metallic copper pieces; and (2) produce thin and flexible copper pieces so that optimal interfacial contact between a copper thin foil-organic sample and the ZnSe ATR crystal would result. These two practical requirements, which are sine qua non for obtaining useful ATR-FTIR data, have been achieved. The absorbance values obtained in spectra of DT/Cu and /Cu samples strongly imply the existence of chemisorbed monolayers. Thus, the chemical viability of copper surfaces which have been prepared according to the controlled etching and preadsorption protocols has also been demonstrated. The reactivity of MUD/Cu samples towards acetyl chloride confirms that addition 2-dimensional chemistry is accessible in suitably functionalized metal-organic assemblies.

It is important to note that all experimental work described herein has been carried out with readily available and relatively inexpensive materials, chemical reagents, analytical instruments, computer resources an molecular modeling software. Thus, meaningful surface science research can be carried out on a limited budget.

Various changes and modifications can be made n the process and products of the present invention without departing from the spirit and scope thereof. The various embodiments described herein were intended to he illustrative and non-limiting.

What is claimed is:

1. A method of reducing the thickness of a thin sheet consisting of metal, having a first major surface and an opposed, second major surface, comprising the steps of:

attaching the first major surface of the thin metallic sheet to a dowel;

preparing a bath containing an etchant; and rotating the thin metallic sheet through the dowel while only the second major surface of the thin metallic sheet contacts the etchant in the bath, to etch away material from the second major surface for a time sufficient to reduce the thickness of the sheet to a desired thin metal sheet thickness; and removing the thin metallic sheet that has been etched from the bath.

2. The method of claim 1 in which the metal sheet is a non-precious metal sheet.

3. The method of claim 2 in which the metal sheet is a copper substrate.

4. The method of claim 3 in which the etch is an inorganic acid.

5. The method of claim 4 in which the etch t is nitric acid.

6. The method of claim 5 in which the contacting step is effected by a sequence of contacting the rotating metal sheet with the etchant under etching conditions and then terminating the contact, and repeating the sequence a plurality of times until the desired thin metal sheet thickness is achieved.

7. The method of claim 6 wherein the thin metal sheet produced is contacted with an organic material so as to form a thin film on a surface of the thin metal sheet.

8. The method of claim 1 in which the etchant is an inorganic acid.

9. The method of claim 8 in which the etchant is nitric acid.

10. The method of claim 9 in which the contacting step is effected by a sequence of contacting the rotating metal sheet with the etchant under etching conditions and then terminating the contact, and repeating the sequence a plurality of times until the desired thin metal sheet thickness is achieved.

11. The method of claim 10 wherein the thin metal foil produced is contacted with an organic material so as to form a thin film on a surface of the thin metal sheet.

12. The method of claim 1 in which the contacting step is effected by a sequence of contacting the rotating metal sheet with the etchant under etching conditions and then terminating the contact, and repeating the sequence a plurality of times until the desired thin metal sheet thickness is achieved.

13. The method of claim 12 wherein the thin metal sheet produced is contacted with an organic material so as to form a thin film on a surface of the thin metal sheet.

14. The method of claim 1 wherein the thin metal sheet produced is contacted with an organic material so as to form a thin film on a surface of the thin metal sheet.

15. The method of claim 1, including rotating the dowel to cause the thin metallic foil to rotate at a rotational speed of about 200 RPM.

16. The method of claim 1, in which the thin metallic sheet is round.

17. The method of claim 1, including attaching the dowel to the first major surface of the sheet by glue.

18. The method of claim 1, including, carrying out the etching as a continuous process.

* * * * *